United States Patent
Zou

(10) Patent No.: US 10,789,084 B2
(45) Date of Patent: Sep. 29, 2020

(54) VIRTUAL MACHINE SCALING METHOD AND DEVICE

(71) Applicant: Huawei Technologies Co., Ltd., Shenzhen (CN)

(72) Inventor: Tao Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 15/629,853

(22) Filed: Jun. 22, 2017

(65) Prior Publication Data

US 2017/0286148 A1  Oct. 5, 2017

Related U.S. Application Data

(63) Continuation of application No. PCT/CN2015/083999, filed on Jul. 14, 2015.

(30) Foreign Application Priority Data

Dec. 23, 2014 (CN) .......................... 2014 1 0814195

(51) Int. Cl.
    *G06F 9/455* (2018.01)
(52) U.S. Cl.
    CPC .......... *G06F 9/45558* (2013.01); *G06F 9/455* (2013.01); *G06F 2009/4557* (2013.01);
    (Continued)
(58) Field of Classification Search
    None
    See application file for complete search history.

(56) References Cited

U.S. PATENT DOCUMENTS

| 8,359,594 B1 * | 1/2013 | Davidson | G06F 9/5077 709/218 |
| 8,458,702 B1 * | 6/2013 | Wu | G06F 9/45504 707/813 |

(Continued)

FOREIGN PATENT DOCUMENTS

| CN | 102932413 A | 2/2013 |
| CN | 103257683 A | 8/2013 |

(Continued)

OTHER PUBLICATIONS

Machine Translation and Abstract of Chinese Publication No. CN102932413, Feb. 13, 2013, 35 pages.
(Continued)

*Primary Examiner* — Kenneth Tang
(74) *Attorney, Agent, or Firm* — Conley Rose, P.C.

(57) ABSTRACT

A virtual machine (VM) scaling method and device is provided. The method includes determining a VM resource pool corresponding to an application when a new VM needs to be added for the application; searching, according to a parameter of the new VM that needs to be added for the application, the determined VM resource pool for a VM that conforms to the parameter; registering the conforming VM with a load balancer (LB); and starting the VM to provide a service for the application. A VM that conforms to a requirement of the application is selected from a pre-created VM resource pool, and the VM is registered to provide a service for the application when a new VM is to be added for an application.

21 Claims, 4 Drawing Sheets

(52) U.S. Cl.
CPC .............. *G06F 2009/45562* (2013.01); *G06F 2009/45575* (2013.01)

(56) References Cited

U.S. PATENT DOCUMENTS

| | | | |
|---|---|---|---|
| 8,631,131 B2 | 1/2014 | Kenneth et al. | |
| 2010/0058342 A1* | 3/2010 | Machida | G06F 9/5077 718/1 |
| 2011/0029970 A1 | 2/2011 | Arasaratnam | |
| 2013/0036328 A1* | 2/2013 | Mutisya | G06F 11/3688 714/15 |
| 2013/0179574 A1 | 7/2013 | Calder et al. | |
| 2013/0179895 A1* | 7/2013 | Calder | G06F 9/5077 718/104 |
| 2013/0275975 A1* | 10/2013 | Masuda | G06F 9/5077 718/1 |
| 2015/0052528 A1* | 2/2015 | French | G06F 9/4856 718/1 |
| 2015/0249615 A1* | 9/2015 | Chen | G06F 9/45558 709/226 |
| 2016/0077860 A1* | 3/2016 | Machida | G06F 9/5077 718/1 |
| 2016/0344650 A1* | 11/2016 | Zhu | G06F 9/45533 |
| 2017/0286148 A1* | 10/2017 | Zou | G06F 9/455 |
| 2019/0347120 A1* | 11/2019 | Kottomtharayil | G06F 9/45533 |

FOREIGN PATENT DOCUMENTS

| | | |
|---|---|---|
| CN | 103559093 A | 2/2014 |
| WO | 2013107141 A1 | 7/2013 |

OTHER PUBLICATIONS

Machine Translation and Abstract of Chinese Publication No. CN103257683, Aug. 21, 2013, 18 pages.
Foreign Communication From a Counterpart Application, PCT Application No. PCT/CN2015/083999, English Translation of International Search Report dated Oct. 14, 2015, 2 pages.
Foreign Communication From a Counterpart Application, PCT Application No. PCT/CN2015/083999, English Translation of Written Opinion dated Oct. 14, 2015, 6 pages.
Foreign Communication From a Counterpart Application, European Application No. 15871671.2, Extended European Search Report dated Dec. 13, 2017, 6 pages.
Machine Translation and Abstract of Chinese Publication No. CN103559093, Feb. 5, 2014, 23 pages.
Foreign Communication From a Counterpart Application, Chinese Application No. 201410814195.3, Chinese Office Action dated Jun. 3, 2019, 7 pages.

* cited by examiner

US 10,789,084 B2

VIRTUAL MACHINE SCALING METHOD AND DEVICE

CROSS-REFERENCE TO RELATED APPLICATIONS

This application is a continuation application of International Patent Application No. PCT/CN2015/083999, filed on Jul. 14, 2015, which claims priority to Chinese Patent Application No. 201410814195.3, filed on Dec. 23, 2014, the disclosures of the aforementioned applications are herein incorporated by reference in their entireties.

TECHNICAL FIELD

The disclosure relates to the field of computer technologies, and in particular, to a virtual machine (VM) scaling method and device.

BACKGROUND

As a profoundest change in the information technology (IT) industry since the Internet revolution, cloud computing implements shielding for services and underlying resources. VM scaling refers to modifying internal parameters of virtual machines (VMs) or a quantity of VMs according to loads of the VMs, so as to meet a resource requirement of an application.

For example, a VM B and a VM C serve an application A in a load balancing manner. Generally, resources provided by the VM B and the VM C can meet a requirement of the application A. However, when a service volume increases, the resources provided by the VM B and the VM C cannot meet the requirements of application A. In this case, VM scaling needs to be performed to newly add a VM D for the application A. In this way, the VM B, the VM C, and the VM D together provide resources to serve the application A. Adding the VM D herein is a manner of the VM scaling.

However, a manner of adding the VM D at present mainly includes the following steps:

First step: A virtualization management system acquires a parameter of the application A from the VM B and the VM C, and determines a scaling rule according to the parameter of the application A.

For example, the parameter of the application A is 80% of central processing unit (CPU) usage, and a scaling rule corresponding to the 80% of CPU usage is obtained according to a correspondence between the 80% of CPU usage and a specified scaling rule, for example, adding a VM.

Second step: The virtualization management system creates the VM D by using the selected scaling rule.

The VM D is created by using the VM B and the VM C as source VMs, and the obtained VM D has a same parameter as that of the VM B and the VM C.

Third step: The virtualization management system starts the VM D and registers the created VM D, so that the VM B, the VM C, and the VM D together provide resources to serve the application A.

However, the current manner of implementing VM scaling consumes a relatively long time, which reduces efficiency of VM scaling, and cannot meet a requirement of an application service.

SUMMARY

In view of this, embodiments of the disclosure provide a VM scaling method and. device, so as to resolve a problem that VM scaling at present consumes a relatively long time and scaling efficiency is relatively low.

According to a first aspect, a VM scaling method is provided, including determining, when a new VM needs to be added for an application, a VM resource pool corresponding to the application; searching, according to a parameter of the new VM that needs to be added for the application, the determined VM resource pool for a VM that conforms to the parameter; registering the found VM with a load balancer (LB); and starting the VM to provide a service for the application.

With reference to the first aspect, in a first possible implementation manner, the searching, according to a parameter of the new VM that needs to be added for the application, the determined VM resource pool for a VM that conforms to the parameter includes, when searching the determined VM resource pool for the VM that conforms to the parameter, if there is no VM that conforms to the parameter in the determined VM resource pool, further searching for whether there is an idle VM in the determined VM resource pool; if a search result is that there is an idle VM, modifying a parameter of the found idle VM according to the parameter of the new VM that needs to be added for the application; and using the idle VM whose parameter has been modified as the VM that is found and that conforms to the parameter.

With reference to the first aspect or the first possible implementation manner of the first aspect, in a second possible implementation manner, that the VM resource pool corresponding to the application is created in the following manner includes calculating a quantity of VMs that need to be configured in the VM resource pool corresponding to the application; determining a parameter of each VM in the VM resource pool according to a parameter of the application or a preset VM configuration rule; and creating each VM in the VM resource pool by using the determined parameter of each VM.

With reference to the second possible implementation manner of the first aspect, in a third possible implementation manner, calculating a quantity of VMs that need to be configured in the VM resource pool corresponding to the application includes calculating, according to a mapping relationship between a resource requirement of the application and a specified proportion of a quantity of VMs, the quantity of VMs that need to be configured to meet the resource requirement of the application.

With reference to the second possible implementation manner of the first aspect or the third possible implementation manner of the first aspect, in a fourth possible implementation manner, determining a parameter of each VM in the VM resource pool according to a parameter of the application or a preset VM configuration rule includes determining, according to the parameter of the application, the parameter of each VM in the VM resource pool corresponding to the application, where parameters of any two of VMs in the VM resource pool are the same; or determining, according to the preset VM configuration rule, a VM resource pool corresponding to multiple applications; and determining parameters of VMs in the VM resource pool according to parameters of the multiple applications, where parameters of at least two of the VMs in the VM resource pool are different.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the method further includes deregistering the VM from the LB when the application determines that a load decreases; and moving the deregistered VM into the VM resource pool corresponding to the application when determining that the VM resource pool corresponding to the application supports VM recycle.

With reference to the fifth possible implementation manner of the first aspect, in a sixth possible implementation manner, moving the deregistered VM into the VM resource pool corresponding to the application includes modifying, when determining that a parameter of the deregistered VM is not the same as a parameter of a VM required by the VM resource pool corresponding to the application, the parameter of the deregistered VM according to the parameter of the VM required by the VM resource pool corresponding to the application; and moving the VM whose parameter has been modified into the VM resource pool corresponding to the application.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the method further includes determining whether a quantity of remaining VMs in the VM resource pool corresponding to the application is the same as a preset VM quantity; determining a quantity of VMs that need to be added if the quantity of the remaining VMs in the VM resource pool corresponding to the application is less than the preset VM quantity; determining, according to the parameter of the application or the preset VM configuration rule, a parameter of each VM that needs to be added; and creating, by using the determined parameter of each VM that needs to be added, each VM that needs to be added.

According to a second aspect, a VM scaling device is provided, including a determining module configured to determine, when a new VM needs to be added for an application, a VM resource pool corresponding to the application; a search module configured to search, according to a parameter of the new VM that needs to be added for the application, the determined VM resource pool for a VM that conforms to the parameter; and a starting module, configured to: register the found VM with an LB; and start the VM to provide a service for the application.

With reference to the second aspect, in a first possible implementation manner, the search module is specifically configured to, when searching the determined VM resource pool for the VM that conforms to the parameter, if there is no VM that conforms to the parameter in the determined VM resource pool, further search for whether there is an idle VM in the determined VM resource pool; if a search result is that there is an idle VM, modify a parameter of the found idle VM according to the parameter of the new VM that needs to be added for the application; and use the idle VM whose parameter has been modified as the VM that is found and that conforms to the parameter.

With reference to the second aspect or the first possible implementation manner of the second aspect, in a second possible implementation manner, the scaling device further includes a creation module, where the creation module is configured to create the VM resource pool corresponding to the application by calculating a quantity of VMs that need to be configured in the VM resource pool corresponding to the application; determining a parameter of each VM in the VM resource pool according to a parameter of the application or a preset VM configuration rule; and creating each VM in the VM resource pool by using the determined parameter of each VM.

With reference to the second possible implementation manner of the second aspect, in a third possible implementation manner, the creation module is specifically configured to calculate, according to a mapping relationship between a resource requirement of the application and a specified proportion of a quantity of VMs, the quantity of VMs that need to be configured to meet the resource requirement of the application.

With reference to the second possible implementation manner of the second aspect or the third possible implementation manner of the second aspect, in a fourth possible implementation manner, the creation module is specifically configured to determine, according to the parameter of the application, the parameter of each VM in the VM resource pool corresponding to the application, where parameters of any two of VMs in the VM resource pool are the same; or determine, according to the preset VM configuration rule, a VM resource pool corresponding to multiple applications; and determine parameters of VMs in the VM resource pool according to parameters of the multiple applications, where parameters of at least two of the VMs in the VM resource pool are different.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the scaling device further includes a contraction module, where the contraction module is configured to deregister the VM from the LB when the application determines that a load decreases; and move the deregistered VM into the VM resource pool corresponding to the application when determining that the VM resource pool corresponding to the application supports VM recycle.

With reference to the fifth possible implementation manner of the second aspect, in a sixth possible implementation manner, the contraction module is specifically configured to modify, when determining that a parameter of the deregistered VM is not the same as a parameter of a VM required by the VM resource pool corresponding to the application, the parameter of the deregistered VM according to the parameter of the VII required by the VM resource pool corresponding to the application; and move the VM whose parameter has been modified into the VM resource pool corresponding to the application.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner, the scaling device further includes a calculation module, where the calculation module is configured to determine whether a quantity of remaining VMs in the VM resource pool corresponding to the application is the same as a preset VM quantity; determine a quantity of VMs that need to be added if the quantity of the remaining VMs in the VM resource pool corresponding to the application is less than the preset VM quantity; determine, according to the parameter of the application or the preset VM configuration rule, a parameter of each VM that needs to be added; and create, by using the determined parameter of each VM that needs to be added, each VM that needs to be added.

Beneficial effects of the disclosure are as follows.

According to the embodiments of the disclosure, when a new VM needs to be added for an application, a VM resource pool corresponding to the application is determined; according to a parameter of the new VM that needs to be added for the application, the determined VM resource pool is searched for a VM that conforms to the parameter; the found VM is registered with an LB; and the VM is started to provide a service for the application. That is, when a new VM needs to be added for an application, a VM that conforms to a requirement of the application is selected from a pre-created VM resource pool, and the VM is registered to provide a service for the application, thereby omitting a process of creating a VM, shortening a time for creating a VM, and effectively improving efficiency of VM scaling.

BRIEF DESCRIPTION OF DRAWINGS

To describe the technical solutions in the embodiments of the disclosure more clearly, the following briefly describes the accompanying drawings required for describing the embodiments. The accompanying drawings in the following description merely show some embodiments of the disclosure, and a person of ordinary skill in the art may still derive other drawings from these accompanying drawings without creative efforts.

DESCRIPTION OF EMBODIMENTS

To achieve an objective of the disclosure, embodiments of the disclosure provide a VM scaling method and device. When a new VM needs to be added for an application, a VM resource pool corresponding to the application is determined; according to a parameter of the new VM that needs to be added for the application, the determined VM resource pool is searched for a VM that conforms to the parameter; the found VM is registered with a LB; and the VM is started to provide a service for the application. That is, when a new VM needs to be added for an application, a VM that conforms to a requirement of the application is selected from a pre-created VM resource pool, and the VM is registered to provide a service for the application, thereby omitting a process of creating a VM, shortening a time for creating a VM, and effectively improving efficiency of VM scaling.

The following further describes each embodiment of the disclosure in detail with reference to accompanying drawings in this specification. Apparently, the described embodiments are merely some but not all of the embodiments of the disclosure. All other embodiments obtained by a person of ordinary skill in the art based on the embodiments of the disclosure without creative efforts shall fall within the protection scope of the disclosure.

Figure 1:
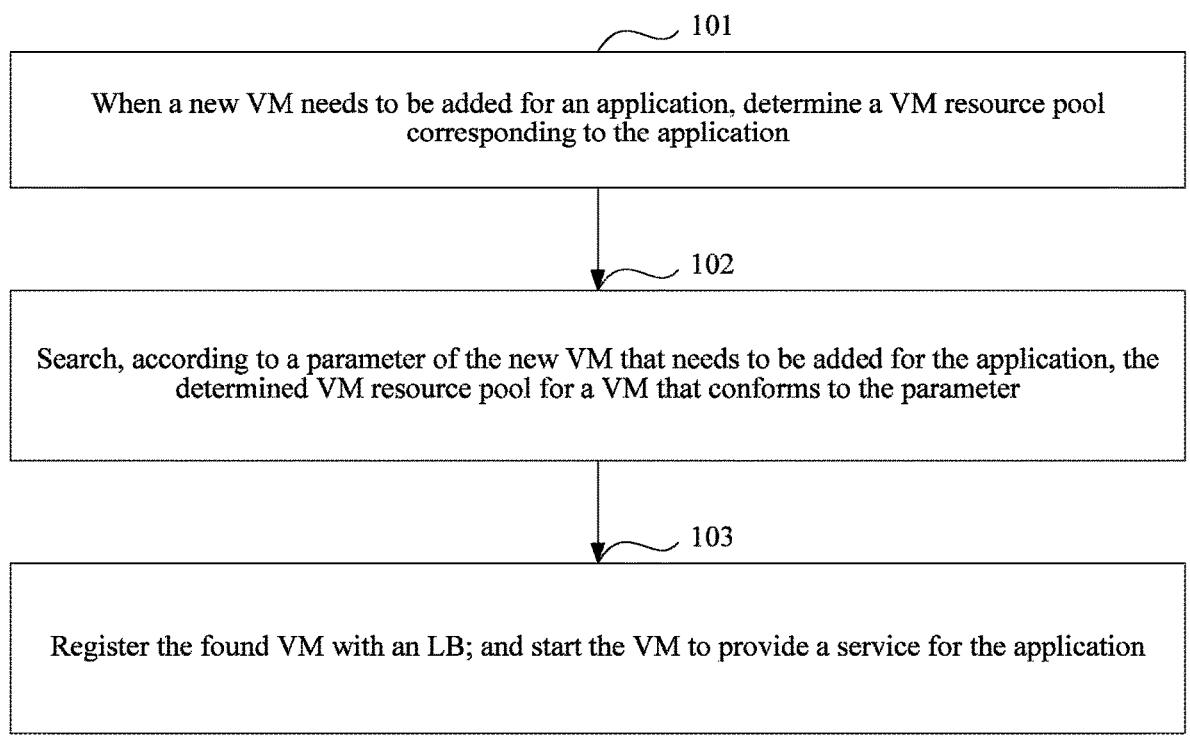
FIG. 1 is a schematic flowchart of a VM stretch method according to an embodiment of the disclosure.

FIG. 1 is a schematic flowchart of a VM stretch method according to an embodiment of the disclosure. The method may be described as follows.

This embodiment of the disclosure proposes that a VM reservation rule of an application is determined on a virtual resource planning stage; initialization of a VM resource pool of the application is implemented according to the VM reservation rule on an application instantiation stage; and when a VM needs to be added on an application running stage, a VM that conforms to a requirement of the application is selected from the VM resource pool corresponding to the application, and the selected VM is registered and started, thereby shortening a process of creating a VM, and effectively improving efficiency of VM scaling.

Step 101: When a new VM needs to be added for an application, determine a VM resource pool corresponding to the application.

In step 101, that initialization of a VM resource pool of the application is implemented according to the VM reservation rule on an application instantiation stage may initialize a corresponding VM resource pool for each instantiation application, that is, a one-to-one relationship between the instantiation application and the VM resource pool is satisfied. Therefore, when the VM resource pool is initialized, a correspondence between an identifier of the instantiation application and the VM resource pool is established. Further, a VM resource pool corresponding to multiple instantiation applications may be initialized, that is, a many-to-one relationship between the instantiation applications and the VM resource pool is satisfied. That is, one VM resource pool is shared by multiple applications. Then, when the VM resource pool is initialized, a correspondence between identifiers of the multiple instantiation applications and the VM resource pool is established.

When a new VM needs to be added for an application, according to a pre-established correspondence between an identifier of an instantiation application and a VM resource pool and an identifier of the application for which the new VM needs to be added, a VM resource pool corresponding to the identifier of the application is determined.

In addition, when the VM resource pool corresponding to the application is determined, it may be further determined whether the VM resource pool corresponding to the application is a VM resource pool shared by multiple applications according to the pre-established correspondence between the identifier of the instantiation application and the VM resource pool.

Step 102: Search, according to a parameter of the new VM that needs to be added for the application, the determined VM resource pool for a VM that conforms to the parameter.

In step 102, for the determined VM resource pool corresponding to the application in step 101, a parameter of each VM in the VM resource pool is acquired.

The parameter of each VM in the VM resource pool is compared with the parameter of the new VM that needs to be added for the application.

If a comparison result is that there is at least one VM whose parameter is the same as the parameter of the new VM that needs to be added for the application in the VM resource pool, then it is determined that there is a VM that conforms to the parameter of the new VM that needs to be added for the application in the VM resource pool, and trigger to perform step 103.

If the comparison result is that there is no VM whose parameter is the same as the parameter of the new VM that needs to be added for the application in the VM resource pool, then it is determined that there is no VM that conforms to the parameter of the new VM that needs to be added for the application in the VM resource pool, and the determined VM resource pool is further searched for whether there is an idle VM.

If a further search result is that there is an idle VM, a parameter of the found idle VM is modified according to the parameter of the new VM that needs to be added for the application.

The idle VM whose parameter has been modified is used as the VM that is found and that conforms to the parameter.

It should be noted that the parameter of the VM described in this embodiment of the disclosure may refer to a virtual resource of the VM, for example, a resource parameter of a CPU, a calculation resource parameter, a memory resource parameter, or a storage resource parameter.

Different VMs may be created by using a uniform parameter or different parameters.

When a VM is created, different parameters may be selected to perform creation according to different applications, or a parameter of the created VM may be determined according to different VM configuration rules, which is not specifically limited herein.

Step 103: Register he found VM with an LB; and start the VM to provide a service for the application.

In step 103, when the VM that satisfies a condition is found, the VM is annotated in the VM resource pool to indicate that the VM has been used.

In this case, a stretch operation of the newly-added VM corresponding to the application ends.

By means of the solution of this embodiment of the disclosure, when a new VM needs to be added for an application, a VM that conforms to a requirement of the application is selected from a pre-created VM resource pool, and the VM is registered to provide a service for the application, thereby omitting a process of creating a VM, shortening a time for creating a VM, and effectively improving efficiency of VM scaling.

Figure 2:
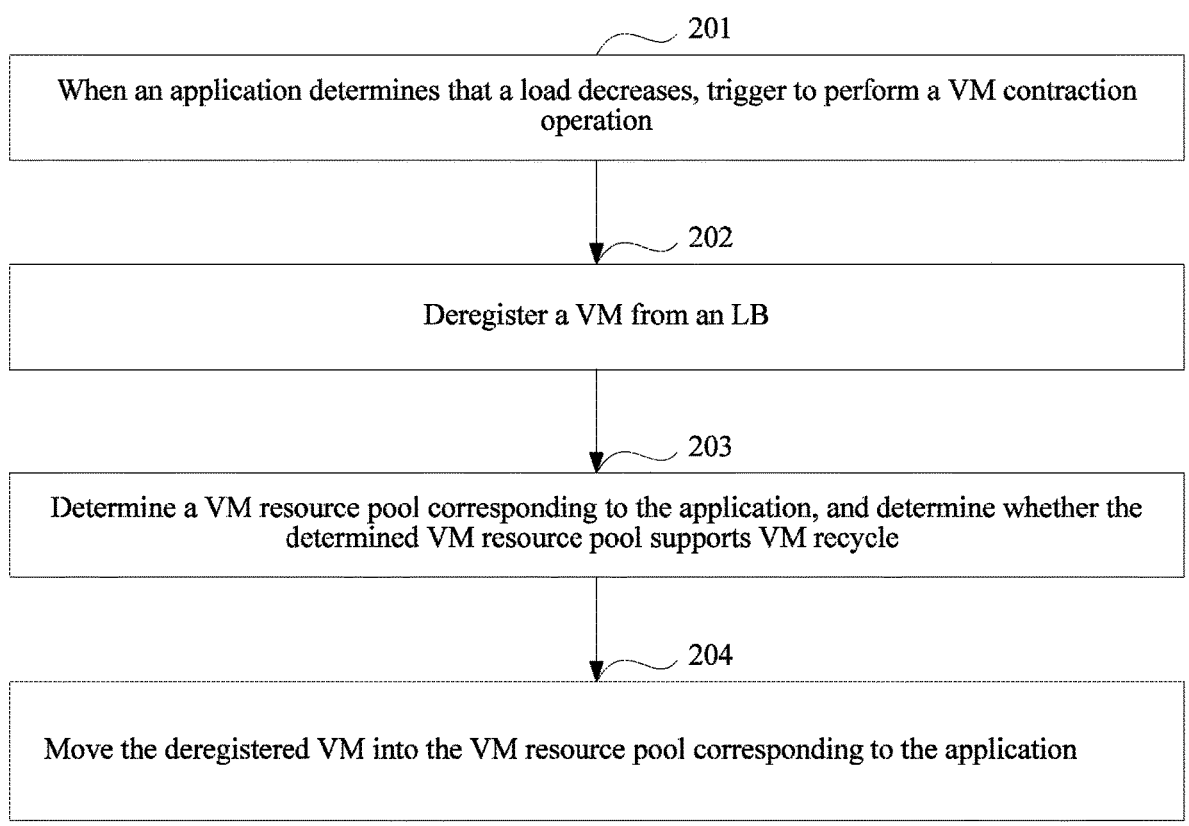
FIG. 2 is a schematic flowchart of a VM contraction method according to an embodiment of the disclosure.

FIG. 2 is a schematic flowchart of a VM contraction method according to an embodiment of the disclosure.

This embodiment of the disclosure may trigger, on the basis of the VM stretch described in FIG. 1, to perform a VM contraction method when a load of an application decreases. The method may be described as follows.

Step 201: When the application determines that the load decreases, trigger to perform a VM contraction operation.

In step 201, a method for determining, by the application, that the load decreases includes but is not limited to:

When CPU usage of the application is less than a specified threshold, it is determined that the load decreases, and excessive VMs do not need to be started. In this case, some VMs need to be released, that is, to perform the VM contraction operation is triggered.

Step 202: Deregister the VM from the LB.

In step 202, the application is stopped when the VM is deregistered from the LB.

Step 203: Determine a VM resource pool corresponding to the application, and determine whether the determined VM resource pool supports VM recycle; and if the determined VM resource pool supports the VM recycle, trigger to perform step 204; otherwise, directly delete the deregistered VM.

Step 204: Move the deregistered VM into the VM resource pool corresponding to the application.

In step 204, the moving the deregistered VM into the VM resource pool corresponding to the application specifically includes first, stopping the VM from working; then, determining whether a parameter of the deregistered VM is the same as a parameter of a VM required by the VM resource pool corresponding to the application; if it is determined that the parameter of the deregistered VM is the same as the parameter of the VM required by the VM resource pool corresponding to the application, moving the deregistered VM into the VM resource pool corresponding to the application; and if it is determined that the parameter of the deregistered VM is different from the parameter of the VM required by the VM resource pool corresponding to the application, modifying the parameter of the deregistered VM according to the parameter of the VM required by the VM resource pool corresponding to the application; and moving the VM whose parameter has been modified into the VM resource pool corresponding to the application.

It should be noted that the moving the deregistered VM into the VM resource pool corresponding to the application may be merely removing the identifier annotating that the VM has been used.

During VM contraction, some VM resource pools do not support recycle of a used VM. Therefore, a VM in a VM resource pool is directly deleted after the VM is used, which causes decrease in a quantity of VMs in the VM resource pool. Some VM resource pools support recycle of a used VM. Therefore, a used VM in the VM resource pool is moved into a VM resource pool again after the VM is used, which causes increase in a quantity of VMs in the VM resource pool. Therefore, to ensure that a quantity of VMs in the VM resource pool keeps steady, optionally, according to this embodiment of the disclosure, after the VM contraction operation is implemented, the method further includes determining whether a quantity of remaining VMs in the VM resource pool corresponding to the application is the same as a preset VM quantity; if the quantity of the remaining VMs in the VM resource pool corresponding to the application is less than the preset VM quantity, determining a quantity of VMs that need to be added; determining a parameter of each VM that needs to be added according to a parameter of the application or a preset VM configuration rule; and creating each VM that needs to be added by using the determined parameter of each VM; and if the quantity of the remaining VMs in the VM resource pool corresponding to the application is greater than the preset VM quantity, determining a quantity of VMs that need to be deleted, selecting a VM from the VM resource pool according to the determined quantity of the VMs that need to be deleted, and deleting the selected VM.

By means of the solution of this embodiment of the disclosure, when a load of an application changes and a quantity of VMs needs to decrease, a VM contraction operation is triggered, and a VM that needs to be removed is recycled to a VM resource pool, so as to ensure that the recycled VM continues to be used subsequently.

Figure 3:
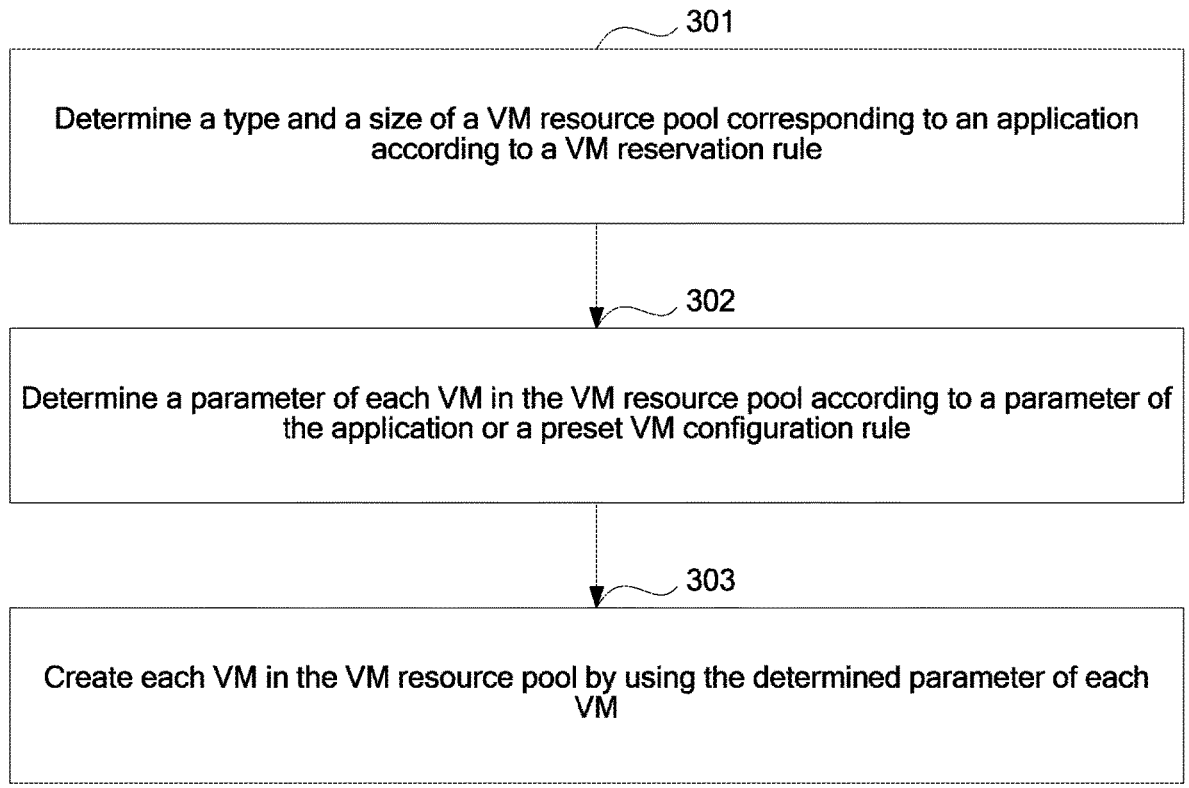
FIG. 3 is a schematic flowchart of a method for creating a VM resource pool according to an embodiment of the disclosure.

FIG. 3 is a schematic flowchart of a method for creating a VM resource pool according to an embodiment of the disclosure. Creation of the VM resource pool in this embodiment of the disclosure occurs on an application instantiation stage, and initialization of the VM resource pool is implemented according to a VM reservation rule. The method may be described as follows.

Step 301: Determine a type and a size of a VM resource pool corresponding to an application according to a VM reservation rule.

In step 301, whether the VM resource pool corresponding to the application is a dedicated VM resource pool or a shared VM resource pool is determined according to a type of an application execution service.

The dedicated VM resource pool refers to using the VM resource pool by only the application, that is, a one-to-one relationship between the application and the dedicated VM resource pool is established.

The so shared VM resource pool refers to using the VM resource pool by multiple applications jointly, that is, a many-to-one relationship between the applications and the shared VM resource pool is established.

A quantity of VMs that need to be configured in the VM resource pool corresponding to the application is calculated according to the VM reservation rule.

Specifically, the quantity of VMs that need to be configured to meet a resource requirement of the application is calculated according to a mapping relationship between the resource requirement of the application and a specified proportion of a quantity of VMs.

For example, the quantity of VMs that need to be configured to meet the resource requirement of the application is calculated according to a preset relationship between the resource requirement of the application and a specified percentage of configured VMs, and the resource requirement of the application.

Alternatively, a specified quantity of VMs are configured in the VM resource pool corresponding to the application according to a quantity of VMs that is specified in the VM reservation rule.

Step 302: Determine a parameter of each VM in the VM resource pool according to a parameter of the application or a preset VM configuration rule.

In step 302, the parameter of each VM in the VM resource pool is determined according to the parameter of the application.

If it is determined that the VM resource pool corresponding to the application is dedicated for the application, it may be determined that parameters of VMs included in the VM resource pool are the same when the parameter of each VM in the VM resource pool is determined.

That is, the VM included in the VM resource pool corresponding to the application have a uniform specification, that is, the parameters of the VMs are all the same.

Alternatively, a VM resource pool corresponding to multiple applications is determined according to the preset VM configuration rule, and parameters of VMs in the VM resource pool are determined according to parameters of the multiple applications.

If it is determined that one VM resource pool is used by multiple applications according to the preset VM configuration rule, parameters of VMs in such VM resource pool may be determined according to parameters of the multiple applications.

For example, parameters of a group of VMs are determined according to a parameter of an application. In this way, the parameters of the group of VMs may be the same in the VM resource pool. In addition, a parameter of another VM in the VM resource pool may be determined by using a parameter of another application. In this way, parameters of VMs determined by using parameters of different applications may be different.

Step 303: Create each VM in the VM resource pool by using the determined parameter of each VM.

By means of the solution of this embodiment of the disclosure, when a new VM needs to be added for an application, a VM that conforms to a requirement of the application is selected from a pre-created VM resource pool, and the VM is registered to provide a service for the application, thereby omitting a process of creating a VM, shortening a time for creating a VM, and effectively improving efficiency of VM scaling.

Figure 4:
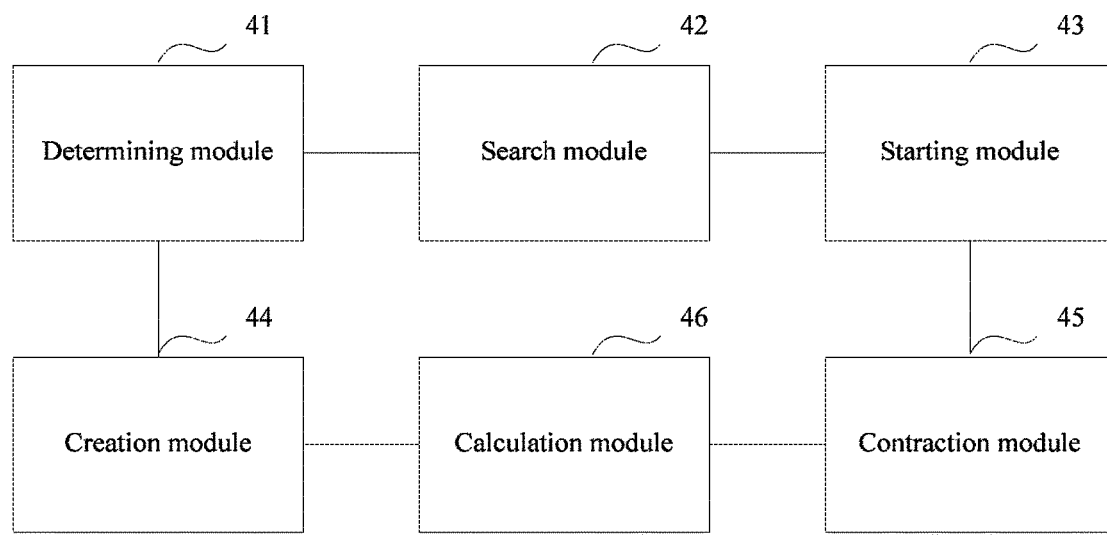
FIG. 4 is a schematic structural diagram of a VM scaling device according to an embodiment of the disclosure.

FIG. 4 is a schematic structural diagram of a VM scaling device according to an embodiment of the disclosure. The scaling device includes a determining module 41, a search module 42, and a starting module 43, where the determining module 41 is configured to determine, when a new VM needs to be added for an application, a VM resource pool corresponding to the application; the search module 42 is configured to search, according to a parameter of the new VM that needs to be added for the application, the determined VM resource pool for a VM that conforms to the parameter; and the starting module 43 is configured to register the found VM with an LB and start the VM to provide a service for the application.

Specifically, the search module 42 is specifically configured to, when searching the determined VM resource pool for the VM that conforms to the parameter, if there is no VM that conforms to the parameter in the determined VM resource pool, further search for whether there is an idle VM in the determined VM resource pool; if a search result is that there is an idle VM, modify a parameter of the found idle VM according to the parameter of the new VIM that needs to be added for the application; and use the idle VM whose parameter has been modified as the VM that is found and that conforms to the parameter.

Optionally, the scaling device further includes a creation module 44, where the creation module 44 is configured to create the VM resource pool corresponding to the application by calculating a quantity of VMs that need to be configured in the VM resource pool corresponding to the application; determining a parameter of each VM in the VM resource pool according to a parameter of the application or a preset VIM configuration rule; and creating each VM in the VM resource pool by using the determined parameter of each VM.

Specifically, the creation module 44 is specifically configured to calculate, according to a mapping relationship between a resource requirement of the application and a specified proportion of a quantity of VMs, the quantity of VMs that need to be configured to meet the resource requirement of the application.

Specifically, the creation module 44 is specifically configured to determine, according to the parameter of the application, the parameter of each VM in the VM resource pool corresponding to the application, where parameters of any two of VMs in the VM resource pool are the same; or determine, according to the preset VM configuration rule, a VM resource pool corresponding to multiple applications; and determine parameters of VMs in the VM resource pool according to parameters of the multiple applications, where parameters of at least two of the VMs in the VM resource pool are different.

Optionally, the scaling device further includes a contraction module 45, where the contraction module 45 is configured to deregister the VM from the LB when the application determines that a load decreases, and move the deregistered VM into the VM resource pool corresponding to the application when determining that the VM resource pool corresponding to the application supports VM recycle.

Specifically, the contraction module 45 is specifically configured to modify, when determining that a parameter of the deregistered VM is not the same as a parameter of a VM required by the VM resource pool corresponding to the application, the parameter of the deregistered VM according to the parameter of the VM required by the VM resource pool corresponding to the application; and move the VM whose parameter has been modified into the VM resource pool corresponding to the application.

Optionally, the scaling device further includes a calculation module 46, where the calculation module 46 is configured to determine whether a quantity of remaining VMs in the VM resource pool corresponding to the application is the same as a preset VM quantity; determine a quantity of VMs that need to be added if the quantity of the remaining VMs in the VM resource pool corresponding to the application is less than the preset VM quantity; determine, according to the parameter of the application or the preset VM configuration rule, a parameter of each VM that needs to be added; and create, by using the determined parameter of each VM that needs to be added, each VM that needs to be added.

It should be noted that the scaling device described in this embodiment of the disclosure may be implemented in a hardware manner or a software manner. When a new VM needs to be added for an application, the scaling device selects a VM that conforms to a requirement of the application from a pre-created VM resource pool, and the VM is registered to provide a service for the application, thereby omitting a process of creating a VM, shortening a time for creating a VM, and effectively improving efficiency of VM scaling.

Figure 5:
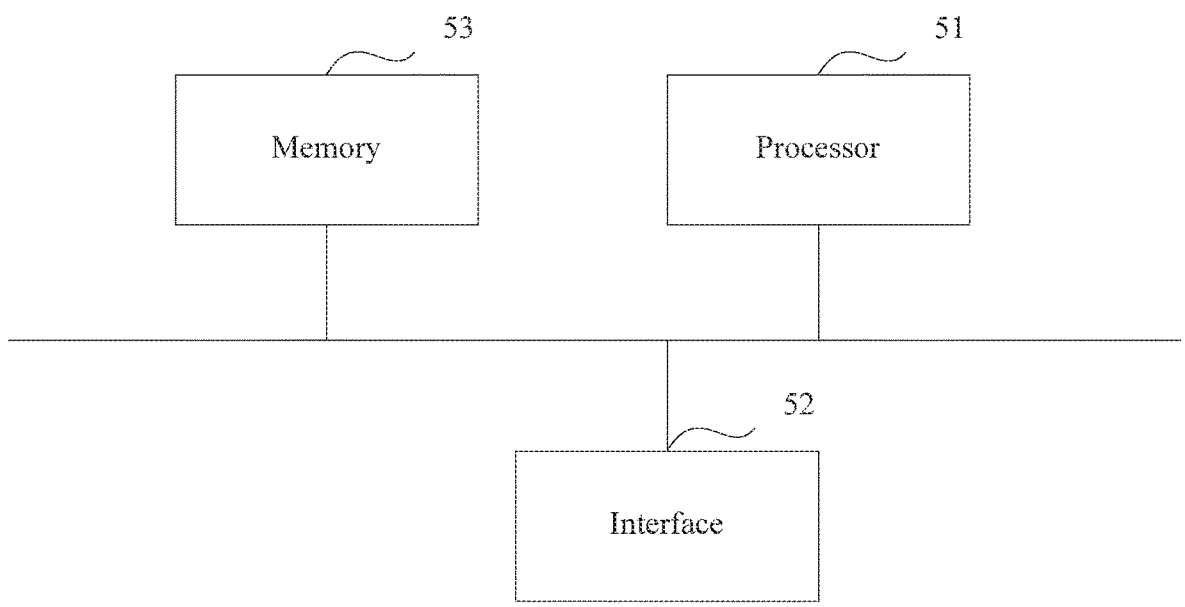
FIG. 5 is a schematic structural diagram of a VM scaling device according to an embodiment of the disclosure.

FIG. 5 is a schematic structural diagram of a VM scaling device according to an embodiment of the disclosure. The scaling device described in this embodiment of the disclosure may have the foregoing VM scaling function. The scaling device may be of a structure of a general-purpose computer system, and the computer system may specifically be a computer based on a processor. The scaling device includes a processor 51, an interface 52, and a memory 53. The processor 51 is connected to the interface 52, and is connected to the memory 53. For example, the processor 51, the interface 52, and the memory 53 may be connected by using a bus, The processor 51 may be a CPU or a combination of a CPU and a hardware chip.

The interface 52 may be one or more of the following: a network interface controller (NIC) providing a wired interface, such as an Ethernet NIC, where the Ethernet NIC may provide a copper-wired and/or fiber interface; and an NIC providing a wireless interface, such as a wireless local area network (WLAN) NIC.

The memory 53 is configured to store program code. The processor 51 obtains the stored program code from the memory and performs corresponding processing according to the obtained program code.

The memory 53 may be a volatile memory, such as a random-access memory (RAM), or a non-volatile memory, such as a read-only memory (ROM), a flash memory, a hard disk drive (HDD), or a solid-state drive (SSD); or a combination of the foregoing types of memories. The memory 53 may further include a content-addressable memory (CAM).

Specifically, the processor 51 executes a program stored in the memory 53 to perform the following operations: determining, by the processor 51, when a new VM needs to be added for an application, a VM resource pool corresponding to the application; searching, according to a parameter of the new VM that needs to be added for the application, the determined VM resource pool for a VM that conforms to the parameter; registering the found VM with a LB; and starting the VM to provide a service for the application.

The processor 51 searches, according to a parameter of the new VM that needs to be added for the application, the determined VM resource pool for a VM that conforms to the parameter by searching the determined VM resource pool for the VM that conforms to the parameter, and if there is no VM that conforms to the parameter in the determined VM resource pool, further searching for whether there is an idle VM in the determined VM resource pool. If a search result is that there is an idle VM, modifying a parameter of the found idle VM according to the parameter of the new VM that needs to be added for the application and using the idle VM whose parameter has been modified as the VM that is found and that conforms to the parameter.

The processor 51 creates the VM resource pool corresponding to the application in the following manner, including calculating a quantity of VMs that need to be configured in the VM resource pool corresponding to the application; determining a parameter of each VM in the VM resource pool according to a parameter of the application or a preset VM configuration rule; and creating each VM in the VM resource pool by using the determined parameter of each VM.

The processor 51 calculates a quantity of VMs that need to be configured in the VM resource pool corresponding to the application by calculating, according to a mapping relationship between a resource requirement of the application and a specified proportion of a quantity of VMs, the quantity of VMs that need to be configured to meet the resource requirement of the application.

The processor 51 determines a parameter of each VM in the VM resource pool according to a parameter of the application or a preset VM configuration rule by determining, according to the parameter of the application, the parameter of each VM in the VM resource pool corresponding to the application, where parameters of any two of VMs in the VM resource pool are the same; or determining, according to the preset VM configuration rule, a VM resource pool corresponding to multiple applications; and determining parameters of VMs in the VM resource pool according to parameters of the multiple applications, where parameters of at least two of the VMs in the VM resource pool are different.

The processor 51 is further configured to deregister the VM from the LB when the application determines that a load decreases; and move the deregistered VM into the VM resource pool corresponding to the application when determining that the VM resource pool corresponding to the application supports VM recycle.

The processor 51 moves the deregistered VM into the VM resource pool corresponding to the application by modifying, when determining that a parameter of the deregistered VM is not the same as a parameter of a VM required by the VM resource pool corresponding to the application, the parameter of the deregistered VM according to the parameter of the VM required by the VM resource pool corresponding to the application; and moving the VM whose parameter has been modified into the VM resource pool corresponding to the application.

The processor 51 is further configured to determine whether a quantity of remaining VMs in the VM resource pool corresponding to the application is the same as a preset VM quantity; determine a quantity of VMs that need to be added if the quantity of the remaining VMs in the VM resource pool corresponding to the application is less than the preset VM quantity; determine, according to the parameter of the application or the preset VM configuration rule, a parameter of each VM that needs to be added; and create, by using the determined parameter of each VM that needs to be added, each VM that needs to be added.

When a new VM needs to be added for an application, the scaling device selects a VM that conforms to a requirement of the application from a pre-created VM resource pool, and the VM is registered to provide a service for the application, thereby omitting a process of creating a VM, shortening a time for creating a VM, and effectively improving efficiency of VM scaling.

A person of ordinary skill in the art may understand that all or some of the steps of the methods in the embodiments may be implemented by a program instructing a processor. The program may be stored in a computer-readable storage medium. The storage medium is a non-transitory medium, for example, a RAM, a ROM, a flash memory, a HDD, a SSD, a magnetic tape, a floppy disk, an optical disc, and any combination thereof.

The disclosure is described with reference to the flowcharts and block diagrams of the method, the device, and the computer program product according to the embodiments of the disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

The foregoing descriptions are merely exemplary implementation manners of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A virtual machine (VM) scaling method comprising:
   determining a VM resource pool corresponding to an application during instantiation of the application, wherein the VM resource pool is to be used by the application, and wherein the VM resource pool comprises a plurality of pre-created VMs;
   determining that at least one VM being used by the application cannot meet a resource requirement of the application, wherein the at least one VM is selected from the VM resource pool;
   searching the VM resource pool for a compatible pre-created VM that is not being used by the application, wherein the compatible pre-created VM conforms to a parameter of the at least one VM and is one of the plurality of pre-created VMs located in the VM resource pool, and wherein the compatible pre-created VM was created before determining that the at least one VM cannot meet the resource requirement of the application;
   registering the compatible pre-created VM with a load balancer (LB);
   starting to use the compatible pre-created VM with the at least one VM to provide a service for the application;
   deregistering the compatible pre-created VM from the LB when the application determines that a load decreases; and
   moving the compatible pre-created VM into the VM resource pool when the VM resource pool supports VM recycle such that the compatible pre-created VM is available for continued use subsequent to moving the compatible pre-created VM into the VM resource pool.

2. The VM scaling method of claim 1, wherein searching the VM resource pool comprises:
   searching for an idle VM in the VM resource pool when no VM in the VM resource pool conforms to the parameter;
   modifying the idle VM based on the parameter of the at least one VM when the idle VM is found in the VM resource pool, wherein the idle VM conforms to the parameter of the at least one VM after the modifying; and
   using the idle VM as the VM that conforms to the parameter.

3. The VM scaling method of claim 2, wherein prior to determining the VM resource pool, the VM scaling method comprises:
   calculating a quantity of the plurality of pre-created VMs in the VM resource pool; and
   creating one or more of the plurality of pre-created VMs in the VM resource pool using the parameter.

4. The VM scaling method of claim 3, wherein calculating the quantity of the plurality of pre-created VMs comprises calculating the quantity of the plurality of pre-created VMs according to a mapping relationship between the resource requirement of the application and a specified proportion of the quantity of the plurality of pre-created VMs.

5. The VM scaling method of claim 1, wherein prior to determining the VM resource pool, the VM scaling method further comprises:
   calculating a quantity of the plurality of pre-created VMs in the VM resource pool; and
   creating one or more of the plurality of pre-created VMs in the VM resource pool using the parameter.

6. The VM scaling method of claim 5, wherein any two of the plurality of pre-created VMs in the VM resource pool comprise the parameter.

7. The VM scaling method of claim 5, wherein a first one of the plurality of pre-created VMs in the VM resource pool comprises the parameter and a second one of the plurality of pre-created VMs in the VM resource pool comprises a different parameter.

8. The VM scaling method of claim 1, wherein moving the compatible pre-created VM into the VM resource pool comprises:
   modifying the compatible pre-created VM according to a second parameter of the VM resource pool when determining that the parameter is not the same as the second parameter; and
   moving the compatible pre-created VM into the VM resource pool.

9. The VM scaling method of claim 1, further comprising:
   determining a quantity of remaining VMs in the VM resource pool;
   determining a to-be added quantity of VMs when the quantity of remaining VMs in the VM resource pool is less than a preset VM quantity; and
   creating the to-be added quantity of VMs that conform to the parameter of the at least one VM.

10. The VM scaling method of claim 1, wherein the parameter is set according to a preset VM configuration rule.

11. A virtual machine (VM) scaling device comprising:
    a memory comprising instructions; and a processor coupled to the memory, wherein the instructions cause the processor to be configured to:
  determine a VM resource pool corresponding to an application during instantiation of the application, wherein the VM resource pool comprises a plurality of VMs;
  use at least one VM from the VM resource pool to provide a service for the application;
  determine that the at least one VM cannot meet a resource requirement of the application;
  search the VM resource pool for a compatible VM that is not being used by the application, wherein the compatible VM conforms to at least one parameter and is one of the plurality of VMs from the VM resource pool, and wherein the compatible VM was created before determining that the at least one VM cannot meet the resource requirement of the application;
  register the compatible VM with a load balancer (LB);
  start using the compatible VM with the at least one VM to provide the service for the application;
  deregister the compatible VM from the LB when the application determines that a load decreases; and
  move the compatible VM into the VM resource pool when the VM resource pool supports VM recycle.

12. The VM scaling device of claim 11, wherein the instructions further cause the processor to be configured to:
  search for an idle VM in the VM resource pool when no VM in the VM resource pool conforms to the parameter;
  modify the idle VM based on the parameter of the at least one VM when the idle VM is found in the VM resource pool, wherein the idle VM conforms to the parameter of the at least one VM after being modified; and
  use the idle VM as the VM that conforms to the parameter.

13. The VM scaling device of claim 12, wherein the instructions further cause the processor to be configured to:
  calculate a quantity of the plurality of VMs in the VM resource pool; and
  create one or more of the plurality of VMs in the VM resource pool using the parameter.

14. The VM scaling device of claim 11, wherein prior to determining the VM resource pool, the instructions further cause the processor to be configured to:
  calculate a quantity of the plurality of VMs in the VM resource pool; and
  create one or more of the plurality of VMs in the VM resource pool using the parameter.

15. The VM scaling device of claim 14, wherein the instructions further cause the processor to be configured to calculate the quantity of the plurality of VMs according to a mapping relationship between the resource requirement of the application and a specified proportion of the quantity of the plurality of VMs.

16. The VM scaling device of claim 14, wherein any two of the plurality of VMs in the VM resource pool comprise the parameter.

17. The VM scaling device according to claim 14, wherein a first one of the plurality of VMs in the VM resource pool comprises the parameter and a second one of the plurality of VMs in the VM resource pool comprises a different parameter.

18. The VM scaling device of claim 11, wherein the instructions further cause the processor to be configured to:
  modify the compatible VM according to a second parameter of the VM resource pool when determining that the parameter in not same as the second parameter; and
  move the compatible VM into the VM resource pool.

19. The VM scaling device of claim 11, wherein the instructions further cause the processor to be configured to:
  determine a quantity of remaining VMs in the VM resource pool;
  determine a to-be added quantity of VMs when the quantity of remaining VMs in the VM resource pool is less than a preset VM quantity; and
  create the to-be added quantity of VMs that conform to the parameter of the at least one VM.

20. The VM scaling device of claim 11, wherein the parameter is set according to a preset VM configuration rule.

21. A virtual machine (VM) scaling method comprising:
  determining a VM resource pool corresponding to an application during instantiation of the application, wherein the VM resource pool is to be used by the application, and wherein the VM resource pool comprises a plurality of existing VMs;
  determining that at least one VM being used by the application cannot meet a resource requirement of the application, wherein the at least one VM is selected from the VM resource pool;
  searching the VM resource pool for a compatible VM that is not being used by the application, wherein the compatible VM conforms to a parameter of the at least one VM and is underutilized, and wherein the compatible VM is one of the existing VMs that was created before determining that the at least one VM cannot meet the resource requirement of the application;
  registering the compatible VM with a load balancer (LB);
  starting to use the compatible VM with the at least one VM to provide a service for the application;
  deregistering the compatible VM from the LB when the application determines that a load decreases such that it is not necessary to use the compatible VM to meet the resource requirement of the application; and
  moving the compatible VM into the VM resource pool when the VM resource pool supports VM recycle such that the compatible VM is available for continued use subsequent to moving the compatible VM into the VM resource pool.

* * * * *